United States Patent
Crettenand et al.

(10) Patent No.: US 12,189,352 B2
(45) Date of Patent: Jan. 7, 2025

(54) OPERATING-SYSTEM-LEVEL SETUP FOR MULTI-ECOSYSTEM SMART-HOME DEVICES

(71) Applicant: Google LLC, Mountain View, CA (US)

(72) Inventors: Alexander Crettenand, San Mateo, CA (US); Gilles Drieu, San Francisco, CA (US); Nathan Sandland, Mountain View, CA (US); Kevin Po, San Francisco, CA (US); Alexei Sakhartchouk, Waterloo (CA); Julius Löwe, Hamburg (DE); Anna Maria Phan, Redwood City, CA (US); Mehdi Kash Khaleghi, San Jose, CA (US); Kevin Coppock, Huntsville, AL (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/838,736

(22) Filed: Jun. 13, 2022

(65) Prior Publication Data
US 2023/0119058 A1     Apr. 20, 2023

Related U.S. Application Data

(60) Provisional application No. 63/270,041, filed on Oct. 20, 2021.

(51) Int. Cl.
*G05B 15/02* (2006.01)
*H04L 12/28* (2006.01)

(52) U.S. Cl.
CPC .......... *G05B 15/02* (2013.01); *H04L 12/2816* (2013.01); *G05B 2219/2642* (2013.01); *H04L 2012/2841* (2013.01)

(58) Field of Classification Search
CPC ............ G05B 15/02; G05B 2219/2642; H04L 12/2816; H04L 2012/2841
See application file for complete search history.

(56) References Cited

U.S. PATENT DOCUMENTS

| | | | |
|---|---|---|---|
| 2014/0266639 A1* | 9/2014 | Zises | ............ G08C 17/02 340/12.28 |
| 2019/0238358 A1 | 8/2019 | Hurewitz | |
| | | (Continued) | |

FOREIGN PATENT DOCUMENTS

WO     2020/117302 A1     6/2020

OTHER PUBLICATIONS

International Search Report and Written Opinion for PCT/US2022/047284 mailed Oct. 20, 2022, all pages.
(Continued)

*Primary Examiner* — Charles R Kasenge
(74) *Attorney, Agent, or Firm* — Kilpatrick Townsend & Stockton LLP

(57) ABSTRACT

A method of performing a setup of a smart home device may include determining, by an operating system of a control device, that a smart home device is present in an enclosure; receiving, by the operating system, information from the smart home device using a multi-ecosystem protocol, wherein the information identifies a type of device for the smart home device; performing, by the operating system, setup operations for the smart home device based on the type of device; and providing, by the operating system, access to the smart home device for an application operating on the control device after the setup operations.

19 Claims, 7 Drawing Sheets

(56) References Cited

U.S. PATENT DOCUMENTS

2021/0120301 A1* 4/2021 Xu ................... H04N 21/42227
2022/0345565 A1* 10/2022 Carrigan ............... G06F 3/0482

OTHER PUBLICATIONS

Sikder Amit Kumar et al: "A Survey on Sensor-Based Threats and Attacks to Smart Devices and Applications", IEEE Communications Surveys & Tutorials, IEEE, USA, vol. 23, No. 2, Mar. 8, 2021, pp. 1125-1159, XP011856169, DOI: 10.1109/COMST.2021.3064507 Section "IV. Existing Sensor Management Systems and Security Needs in Smart Devices".

* cited by examiner

OPERATING-SYSTEM-LEVEL SETUP FOR MULTI-ECOSYSTEM SMART-HOME DEVICES

CROSS-REFERENCE TO RELATED APPLICATIONS

This application claims to the benefit of U.S. Provisional Patent Application No. 63/270,041, filed Oct. 20, 2021, which is incorporated here by reference.

TECHNICAL FIELD

This patent specification relates to systems, methods, and related computer program products for commissioning and setting up smart home devices. More particularly, this specification relates to using an operating system and a multi-ecosystem protocol to perform commissioning, setup, and/or control operations for smart home devices in a multi-ecosystem environment.

BACKGROUND

A smart home refers to a home that includes smart home devices that are networked together to form an ecosystem for automation, providing information and entertainment, and controlling electronic devices. A smart home ecosystem includes smart home devices that work together to accomplish tasks or share information using wired or wireless communication protocols. The advantages of using a smart home ecosystem are numerous, including providing a seamless user experience and compatibility between devices without adapters or other bridge protocols/devices to enable communication and information sharing. However, not all ecosystems of connected devices are open to devices for manufacturers outside of those ecosystems. Integrating smart home devices from one ecosystem into another ecosystem can pose technical challenges for control devices and network communications. Additionally, commissioning and registering these devices with an existing ecosystem can be a frustrating and problematic process for users. Therefore, improvements are needed in the art.

BRIEF SUMMARY

In some embodiments, a method of performing a setup of a smart home device may include determining, by an operating system of a control device, that a smart home device is present in an enclosure a structure. The method may also include receiving, by the operating system, information from the smart home device using a multi-ecosystem protocol. The information may identify a type of device for the smart home device. The method may additionally include performing, by the operating system, setup operations for the smart home device based on the type of device. The method may further include providing, by the operating system, access to the smart home device for an application operating on the control device after the setup operations.

In some embodiments, a non-transitory computer-readable medium may include instructions that, when executed by one or more processors, cause the one or more processors to perform operations including determining, by an operating system of a control device, that a smart home device is present in a structure. The operations may also include receiving, by the operating system, information from the smart home device using a multi-ecosystem protocol. The information may identify a type of device for the smart home device. The operations may additionally include performing, by the operating system, setup operations for the smart home device based on the type of device. The operations may further include providing, by the operating system, access to the smart home device for an application operating on the control device after the setup operations.

In some embodiments, a control device may include one or more processors and one or more memory devices. The one or more memory devices may include instructions that, when executed by the one or more processors, cause the one or more processors to perform operations including determining, by an operating system of a control device, that a smart home device is present in a structure. The operations may also include receiving, by the operating system, information from the smart home device using a multi-ecosystem protocol. The information may identify a type of device for the smart home device. The operations may additionally include performing, by the operating system, setup operations for the smart home device based on the type of device. The operations may further include providing, by the operating system, access to the smart home device for an application operating on the control device after the setup operations.

In any embodiments, any or all of the following features may be implemented in any combination and without limitation. The method/operations may also include automatically detecting a presence of the smart home device in the structure. Automatically detecting the presence of the smart home device may include receiving a wireless transmission from the smart home device, and the wireless transmission may be initiated by bringing the smart home device within a proximity of a control device and pressing a button on the smart home device. The information may be received from the smart home device by scanning a code from the smart home device. The information from the smart home device may include a device type. The device type may include a thermostat, a hazard detector, a component of a security system, a smart appliance, or a smart doorbell. The information may include one or more controls for providing commands to the smart home device. The method/operations may also include assigning, by the operating system, a standard set of controls to the smart home device based on the type of the device. The standard set of controls may include controls for turning the smart home device on or off. The standard set of controls may be retrieved from an online database based on the type of the smart home device. The setup operations may include connecting the smart home device to a local Wi-Fi network using the multi-ecosystem protocol. The setup operations may also include providing credentials for the local Wi-Fi network to the smart home device using the multi-ecosystem protocol. The setup operations may include registering the smart home device with a smart home ecosystem of the structure, and the smart home ecosystem of the structure may be provided from a first manufacturer that may be different from a second manufacturer of the smart home device. The control device may include a smart phone or an electronic home assistant, the instructions may be part of a universal setup utility for commissioning a plurality of smart home devices that may be part of a smart home environment, and the smart home environment may include an ecosystem that may be different from an ecosystem of a manufacturer of the smart home device. Providing access to the smart home device for the application may include the application communicating directly with the smart home device using the multi-ecosystem protocol. Providing access to the smart home device for the application may include the application communicating with the operating system, and the operating system communicating with the smart home device using the multi-ecosystem protocol. The method/operations may also include, as part of the setup operations, receiving a universal resource locator (URL) from the smart home device, and using the URL to retrieve a process that executes at least a portion of the setup operations for the smart home device. The method/operations may also include accessing a cloud component of a manufacturer of the smart home device by the process as part of the setup operations.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
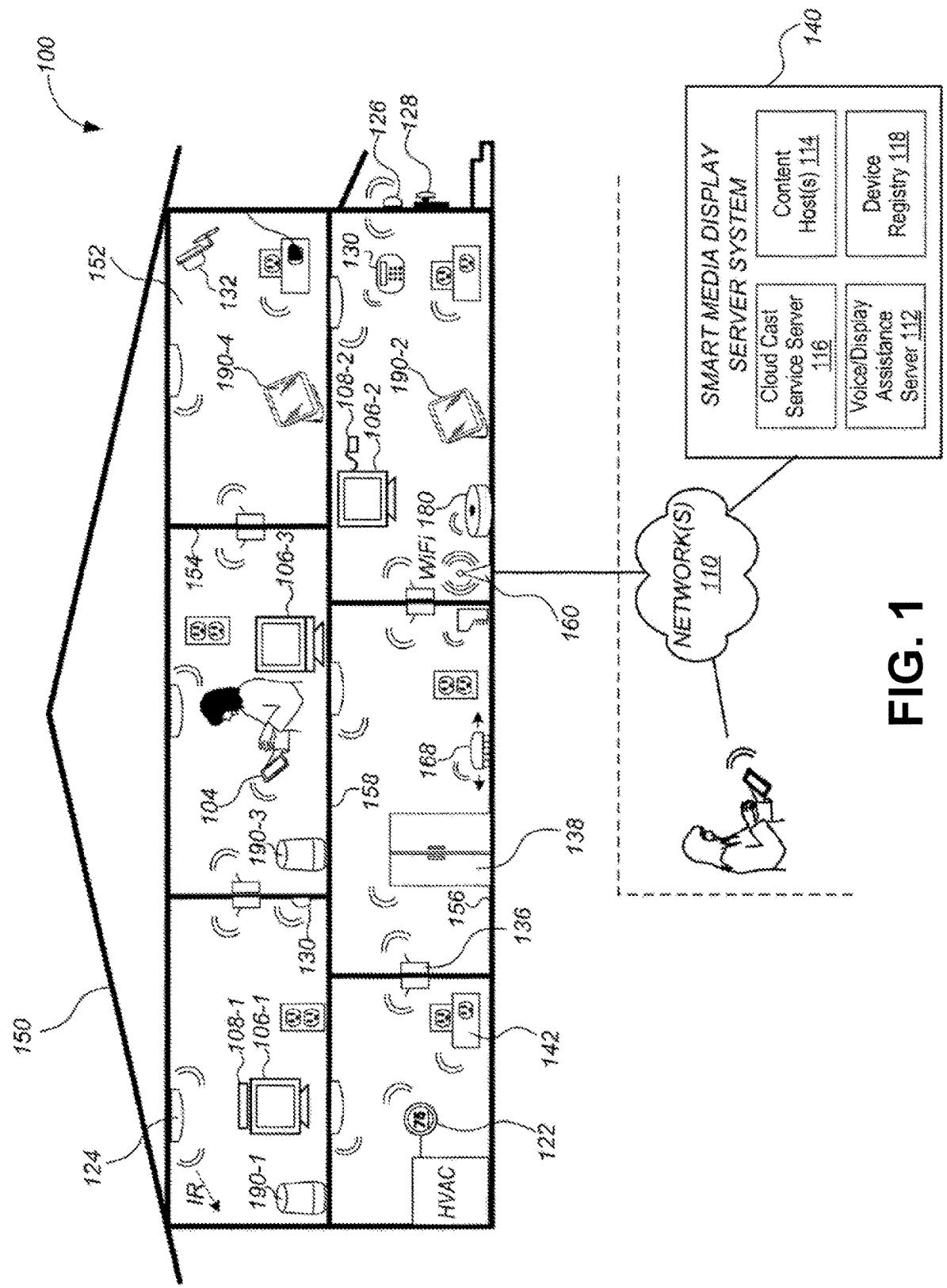
FIG. 1 illustrates an example smart home environment in accordance with some implementations.

FIG. 1 illustrates an example smart home environment 100 in accordance with some implementations. The smart home environment 100 includes a structure 150 (e.g., a house, office building, garage, or mobile home) with various integrated devices (also referred to herein as "connected" or "smart" devices). It will be appreciated that smart devices may also be integrated into a smart home environment 100 that does not include an entire structure 150, such as an apartment, condominium, or office space. In some implementations, the smart devices include one or more of: personal client devices 104 (e.g., tablets, laptops or mobile phones), display devices 106, media casting or streaming devices 108, thermostats 122, home protection devices 124 (e.g., smoke, fire and carbon dioxide detector), home security devices (e.g., motion detectors, window and door sensors and alarms), including connected doorbell/cameras 126, connected locksets 128, alarm systems 130 and cameras 132, connected wall switches transponders 136, connected appliances 138, WiFi communication devices 160 (e.g., hubs, routers, extenders), connected home cleaning devices 168 (e.g., vacuum or floor cleaner), smart home communication and control hubs 180, voice assistant devices and display assistant devices 190, and/or other smart home devices.

It is to be appreciated that the term "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, yards, parks, and more generally any living space or work space.

It is also to be appreciated that while the terms user, customer, installer, homeowner, occupant, guest, tenant, landlord, repair person, and the like may be used to refer to a person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158.

One or more media devices are disposed in the smart home environment 100 to provide users with access to media content that is stored locally or streamed from a remote content source (e.g., content host(s) 114). In some implementations, the media devices include media output devices 106, which directly output/display/play media content to an audience, and/or cast devices 108, which stream media content received over one or more networks to the media output devices 106. Examples of the media output devices 106 include, but are not limited to, television (TV) display devices, music players and computer monitors. Examples of the cast devices 108 include, but are not limited to, medial streaming boxes, casting devices (e.g., GOOGLE CHROMECAST devices), set-top boxes (STBs), DVD players, TV boxes, and so forth.

In the example smart home environment 100, media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-3 includes a smart TV device that integrates an embedded casting unit to stream media content for display to its audience. The media output device 106-2 includes a regular TV display that is coupled to a TV box 108-1 (e.g., Google TV or Apple TV products), and such a TV box 108-2 streams media content received from a media content host server 114 and provides an access to the Internet for displaying Internet-based content on the media output device 106-2.

In addition to the media devices 106 and 108, one or more electronic devices 190 and are disposed in the smart home environment 100. Electronic devices 190 are display assistant devices and/or voice assistant devices. In some implementations, the display assistant device 190 is also a voice assistant device. The electronic devices 190 collect audio inputs for initiating various media play functions of the devices 190 and/or media devices 106 and 108. In some implementations, the devices 190 are configured to provide media content that is stored locally or streamed from a remote content source. In some implementations, the electronic devices 190 are voice-activated and are disposed in proximity to a media device, for example, in the same room with the cast devices 108 and the media output devices 106. Alternatively, in some implementations, a voice-activated display assistant device 190-1 is disposed in a room having one or more smart home devices but not any media device. Alternatively, in some implementations, a voice-activated electronic device 190 is disposed in a location having no networked electronic device. This allows for the devices 190 to communicate with the media devices and share content that is being displayed on one device to another device (e.g., from device 190-1 to device 190-2 and/or media devices 108).

The voice-activated electronic device 190 includes at least one microphone, a speaker, a processor and memory storing at least one program for execution by the processor. The speaker is configured to allow the electronic device 190 to deliver voice messages to a location where the electronic device 190 is located in the smart home environment 100, thereby broadcasting information related to a current media content being displayed, reporting a state of audio input processing, having a conversation with or giving instructions to a user of the electronic device 190. For instance, in some embodiments, in response to a user query the device provides audible information to the user through the speaker. As an alternative to the voice messages, visual signals could also be used to provide feedback to the user of the electronic device 190 concerning the state of audio input processing, such as a notification displayed on the device.

In accordance with some implementations, an electronic device 190 is a voice interface device that is network-connected to provide voice recognition functions with the aid of a server system 140. In some implementations, the server system 140 includes a cloud cast service server 116 and/or a voice/display assistance server 112. For example, in some implementations an electronic device 190 includes a smart speaker that provides music (e.g., audio for video content being displayed on the device 190 or on a display device 106) to a user and allows eyes-free and hands-free access to a voice assistant service (e.g., Google Assistant). Optionally, the electronic device 190 is a simple and low cost voice interface device, e.g., a speaker device and a display assistant device (including a display screen having no touch detection capability).

In some implementations, the voice-activated electronic devices 190 integrates a display screen in addition to the microphones, speaker, processor and memory (e.g., 190-2 and 190-4), and are referred to as "display assistant devices." The display screen is configured to provide additional visual information (e.g., media content, information pertaining to media content, etc.) in addition to audio information that can be broadcast via the speaker of the voice-activated electronic device 190. When a user is nearby and his or her line of sight is not obscured, the user may review the additional visual information directly on the display screen of the display assistant device. Optionally, the additional visual information provides feedback to the user of the electronic device 190 concerning the state of audio input processing. Optionally, the additional visual information is provided in response to the user's previous voice inputs (e.g., user queries), and may be related to the audio information broadcast by the speaker. In some implementations, the display screen of the voice-activated electronic devices 190 includes a touch display screen configured to detect touch inputs on its surface (e.g., instructions provided through the touch display screen). Alternatively, in some implementations, the display screen of the voice-activated electronic devices 190 is not a touch display screen, which is relatively expensive and can compromise the goal of offering the display assistant device 190 as a low cost user interface solution.

When voice inputs from the electronic device 190 are used to control the electronic device 190 and/or media output devices 106 via the cast devices 108, the electronic device 190 effectively enables a new level of control of cast-enabled media devices independently of whether the electronic device 190 has its own display. In an example, the electronic device 190 includes a casual enjoyment speaker with far-field voice access and functions as a voice interface device for Google Assistant. The electronic device 190 could be disposed in any room in the smart home environment 100. When multiple electronic devices 190 are distributed in multiple rooms, they become audio receivers that are synchronized to provide voice inputs from all these rooms. For instant, a first electronic device 190 may receive a user instruction that is directed towards a second electronic device 190-2 (e.g., a user instruction of "OK Google, show this photo album on the kitchen device.").

Specifically, in some implementations, an electronic device 190 includes a WiFi speaker with a microphone that is connected to a voice-activated personal assistant service (e.g., Google Assistant). A user could issue a media play request via the microphone of electronic device 190, and ask the personal assistant service to play media content on the electronic device 190 itself and/or on another connected media output device 106. For example, the user could issue a media play request by saying to the Wi-Fi speaker "OK Google, Play cat videos on my Living room TV." The personal assistant service then fulfils the media play request by playing the requested media content on the requested device using a default or designated media application.

In some implementations, the display assistant device includes a display screen and one- or more built in cameras (e.g., 190-4). The cameras are configured to capture images and/or videos, which are then transmitted (e.g., streamed) to a server system 140 for display on client devices(s).

In some implementations, the voice-activated electronic devices 190, smart home devices could also be mounted on, integrated with and/or supported by a wall 154, floor 156 or ceiling 158 of the smart home environment 100 (which is also broadly called as a smart home environment in view of the existence of the smart home devices). The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the smart home environment 100 as a cast device 108 and/or an output device 106, and therefore, is located in proximity to or with a known distance with respect to the cast device 108 and the output device 106.

In some implementations, the smart home devices in the smart home environment 100 includes, but are not limited to, one or more intelligent, multi-sensing, network-connected camera systems 132. In some embodiments, content that is captured by the camera systems 132 is displayed on the electronic devices 190 at a request of a user (e.g., a user instruction of "OK Google, Show the baby room monitor.") and/or according to settings of the home environment 100 (e.g., a setting to display content captured by the camera systems during the evening or in response to detecting an intruder).

The smart home devices in the smart home environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, and one or more intelligent, multi-sensing, network-connected wall switches 136. In some implementations, the smart home devices in the smart home environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The smart home devices in the smart home environment 100 may additionally or alternatively include one or more other occupancy sensors (e.g., touch screens, IR sensors, ambient light sensors and motion detectors). In some implementations, the smart home devices in the smart home environment 100 include radio-frequency identification (RFID) readers (e.g., in each room 152 or a portion thereof) that determine occupancy based on RFID tags located on or embedded in occupants. For example, RFID readers may be integrated into the smart hazard detectors.

In some implementations, in addition to containing sensing capabilities, devices 122, 124, 126, 128, 130, 132, 136, 138, and 190 (which are collectively referred to as "the smart home devices" or "the smart home devices 120") are capable of data communications and information sharing with other smart home devices, a central server or cloud-computing system, and/or other devices (e.g., the client device 104, the cast devices 108 and the voice-activated electronic devices 190) that are network-connected. Similarly, each of the cast devices 108 and the voice-activated electronic devices 190 is also capable of data communications and information sharing with other cast devices 108, voice-activated electronic devices 190, smart home devices, a central server or cloud-computing system 140, and/or other devices (e.g., the client device 104) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the cast devices 108, the electronic devices 190 and the smart home devices serve as wireless or wired repeaters. In some implementations, a first one of and the cast devices 108 communicates with a second one of the cast devices 108 and the smart home devices 120 via a wireless router. The cast devices 108, the electronic devices 190 and the smart home devices 120 may further communicate with each other via a connection (e.g., network interface 160) to a network, such as the Internet 110. Through the Internet 110, the cast devices 108, the electronic devices 190 and the smart home devices 120 may communicate with a server system 140 (also called a central server system and/or a cloud-computing system herein). Optionally, the server system 140 may be associated with a manufacturer, support entity, or service provider associated with the cast devices 108 and the media content displayed to the user.

In general, any of the connected electronic devices described herein can be configured with a range of capabilities for interacting with users in the environment. For example, an electronic device can be configured with one or more microphones, one or more speakers and voice-interaction capabilities in which a user interacts with the device display assistant device via voice inputs received by the microphone and audible outputs played back by the speakers to present information to users. Similarly, an electronic device can be configured with buttons, switches and/or other touch-responsive sensors (such as a touch screen, touch panel, or capacitive or resistive touch sensors) to receive user inputs, and with haptic or other tactile feedback capabilities to provide tactile outputs to users. An electronic device can also be configured with visual output capabilities, such as a display panel and/or one or more indicator lights to output information to users visually. In addition, an electronic device can be configured with movement sensors that can detect movement of objects and people in proximity to the electronic device, such as a radar transceiver(s) or PIR detector(s).

Inputs received by any of these sensors can be processed by the electronic device and/or by a server communicatively coupled with the electronic device (e.g., the server system 140 of FIG. 1). In some implementations, the electronic device and/or the server processes and/or prepares a response to the user's input(s), which response is output by the electronic device via one or more of the electronic device's output capabilities. In some implementations, the electronic device outputs via one or more of the electronic device's output capabilities information that is not directly responsive to a user input, but which is transmitted to the electronic device by a second electronic device in the environment, or by a server communicatively coupled with the electronic device. This transmitted information can be of virtually any type that is displayable/playable by the output capabilities of the electronic device.

The server system 140 provides data processing for monitoring and facilitating review of events (e.g., motion, audio, security, etc.) from data captured by the smart devices 120, such as video cameras 132, smart doorbells 126, and display assistant device 190-4. In some implementations, the server system 140 may include a voice/display assistance server 112 that processes audio inputs collected by voice-activated electronic devices 190, one or more content hosts 114 that provide the displayed media content, and a cloud cast service server 116 creating a virtual user domain based on distributed device terminals. The server system 140 also includes a device registry for keeping a record of the distributed device terminals in the virtual user environment. Examples of the distributed device terminals include, but are not limited to, the voice-activated electronic devices 190, cast devices 108, media output devices 106 and smart home devices 122-138. In some implementations, these distributed device terminals are linked to a user account (e.g., a Google user account) in the virtual user domain. In some implementations, each of these functionalities and content hosts is a distinct server within the server system 140. In some implementations, a subset of these functionalities is integrated within the server system 140.

In some implementations, the network interface 160 includes a conventional network device (e.g., a router). The smart home environment 100 of FIG. 1 further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 2:
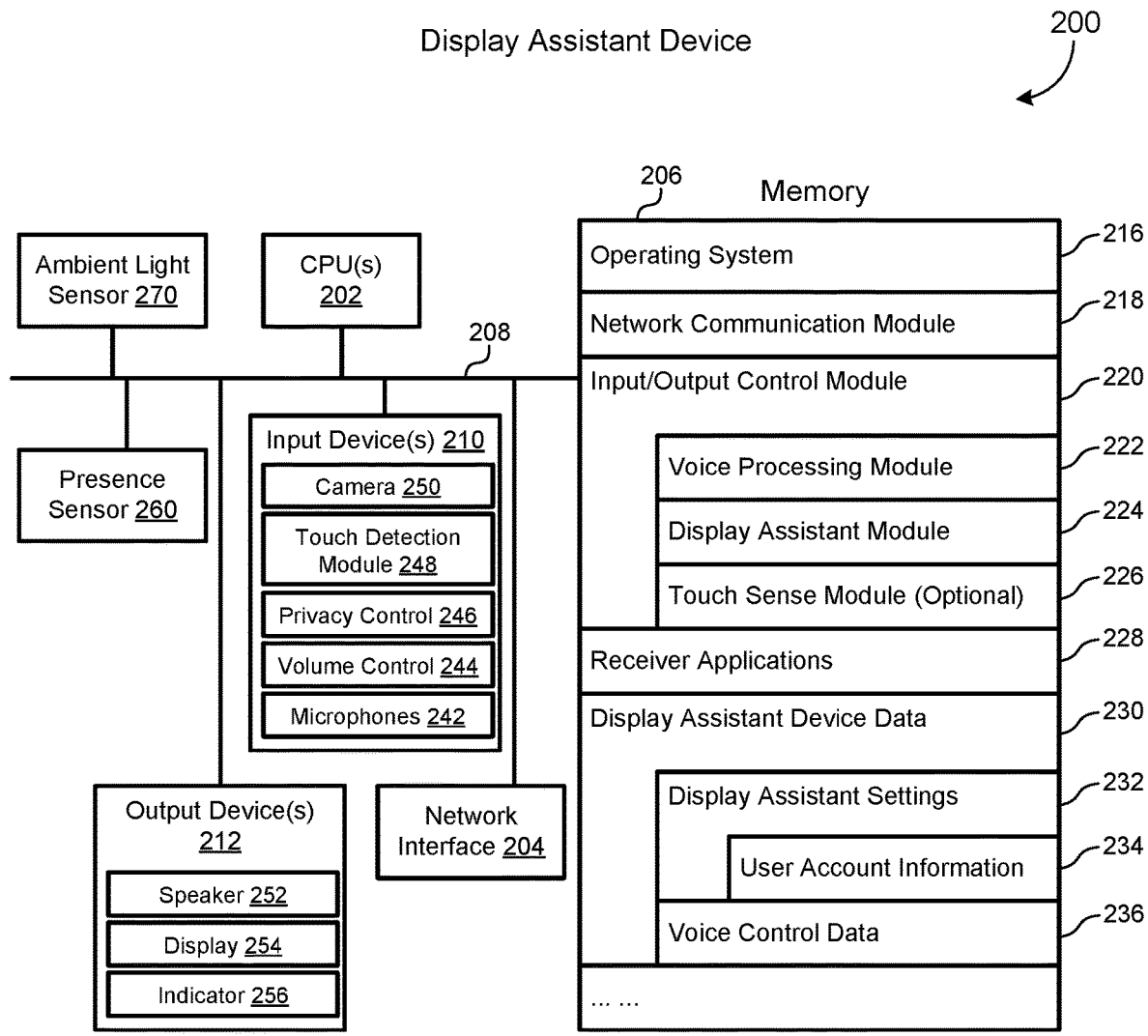
FIG. 2 is a block diagram illustrating an example display assistant device that is applied as a voice interface to collect user voice commands in a smart home environment in accordance with some implementations.

FIG. 2 is a block diagram illustrating an example display assistant device 200 that is applied as a voice interface to collect user voice commands in a smart home environment 100 in accordance with some implementations. The display assistant device 200 typically includes one or more processing units (CPUs) 202, one or more network interfaces 204, memory 206, and one or more communication buses 208 for interconnecting these components (sometimes called a chipset). The display assistant device 200 includes one or more output devices 212, including one or more speakers 252, a display 254 and one or more indicators 256. The display assistant device 200 also includes one or more input devices 210 that facilitate user input, including one or more microphones 242, a volume control 244 and a privacy control 246. The volume control 244 is configured to receive a user action (e.g., a press on a volume up button or a volume down button, a press on both volumes up and down buttons for an extended length of time) that controls a volume level of the speakers 252 or resets the display assistant device 200. The privacy control 246 is configured to receive a user action that controls privacy settings of the display assistant device (e.g., whether to deactivate the microphones 242). The one or more indicator 256 is configured to indicate at least whether the microphone 242 is deactivated (e.g., muted). In some implementations, the input devices 210 of the display assistant device 200 include a touch detection module 248 that is integrated on the display panel 254 and configured to detect touch inputs on its surface. In some implementations, the input devices 210 of the display assistant device 200 include a camera module 250 configured to capture a video stream of a field of view. Alternatively, in some implementations, the input devices 210 of the display assistant device 200 does not include any camera or touch detection module, because they are relatively expensive and can compromise the goal of offering the display assistant device 200 as a low cost user interface solution.

In some implementations, the display assistant device 200 further includes a presence sensor 260 configured to detect a presence of a user in a predetermined area surrounding the display assistant device 200. Under some circumstances, the display assistant device 200 operates at a sleep or hibernation mode that deactivates detection and processing of audio inputs, and does not wake up from the sleep or hibernation mode or listen to the ambient (i.e., processing audio signals collected from the ambient) until the presence sensor 260 detects a presence of a user in the predetermined area. An example of the presence sensor 260 is an ultrasonic sensor configured to detect a presence of a user.

In some implementations, the display assistant device 200 further includes an ambient light sensor 270 (e.g., a white ambient light sensor, an RGB color sensor). The ambient light sensor 270 is configured to detect a light condition in the smart home environment 100 where the display assistant device 200 sits. In some implementations, the display assistant device 200 is configure to adjust a brightness level and/or a color tone of its screen according to the light condition. The ambient light sensor 270 are disposed behind a bezel area of the screen of the display assistant device 200, and exposed to light via transparent part of the bezel area.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium.

In some implementations, memory 206, or the non-transitory computer readable storage medium of memory 206, stores the following programs, modules, and data structures, or a subset or superset thereof: (1) Operating system 216 including procedures for handling various basic system services and for performing hardware dependent tasks; (2) Network communication module 218 for connecting the display assistant device 200 to other devices (e.g., the server system 140, cast device 108, client device 104, smart home devices 120 and other voice-activated electronic device(s) 190) via one or more network interfaces 204 (wired or wireless) and one or more networks 110, such as the Internet, other wide area networks, local area networks, metropolitan area networks, and so on; (3) Input/output control module 220 for receiving inputs via one or more input devices 210 enabling presentation of information at the display assistant device 200 via one or more output devices 212.

The one or more output devices may include: (1) Voice processing module 222 for processing audio inputs or voice messages collected in an environment surrounding the display assistant device 200, or preparing the collected audio inputs or voice messages for processing at a voice/display assistance server 112 or a cloud cast service server; (2) Display assistant module 224 for displaying additional visual information including but not limited to a media content item (e.g., a YouTube video clip), news post, social media message, weather information, personal picture, a state of audio input processing, and readings of smart home devices; and/or (3) Touch sense module 226 for sensing touch events associated with the touch detection module 248 on a top surface of the display assistant device 200.

The memory 206 may also include one or more receiver application 228 for responding to user commands extracted from audio inputs or voice messages collected in an environment surrounding the display assistant device 200, including but not limited to, a media play application, an Internet search application, a social network application and a smart device application. The memory 206 may also include Display assistant device data 230 storing at least data associated with the display assistant device 200. The data may include display assistant settings 232 for storing information associated with the display assistant device 200 itself, including common device settings (e.g., service tier, device model, storage capacity, processing capabilities, communication capabilities, etc.) and information of a user account 234 in a virtual user domain to which the display assistant device 200 is linked. The data may also include voice control data 236 for storing audio signals, voice messages, response messages and other data related to voice interface functions of the display assistant device 200.

In some implementations, the input/output control module 220 further includes an image processing module (not shown) configured to process image data captured by the camera module 250. Specifically, in an example, the image processing module is configured to analyze the image data captured by the camera module 250 and associate biometric features (e.g., face, voice and gesture) recognized from the image data with known or unknown users. User profiles can be selected based on the biometric features to control the display assistant device 200 itself, cast devices 106 or smart home devices adaptively.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

The smart home environment described above continues to proliferate in homes across the world. Specifically, smart home devices have been developed to control almost every aspect of the home experience, from speakers, smart appliances, security systems, thermostats, hazard detectors, doorbells, and so forth as described in detail above in FIG. 1. As the number of different devices continues to expand, the number of different smart home device manufacturers also continues to grow. Many companies now manufacture and sell smart home devices, thus giving customers a wide array of products from which to choose. While some customers may prefer to use smart home devices exclusively from one manufacturer, other customers may prefer to pick and choose devices from different manufacturers according to the advantages and disadvantages offered by each.

Although customers may wish to use devices from many different manufacturers, it is often convenient for all the smart home devices in a structure (e.g., a home or an office building) to be controlled and operated through a single cohesive system or interface. Previously, each smart home device manufacturer provided their own "ecosystem" for controlling and monitoring smart home devices. Adding a new device from another manufacturer often required the installation and maintenance of multiple smart home ecosystems together. As used herein, the term "ecosystem" a software system and/or operating environment provided by a single manufacturer. For example, the most popular smart home ecosystems at the time of this disclosure include Google Home®, Amazon Alexa®, Apple Homekit®, Samsung SmartThings®, and so forth. Each ecosystem may define its own communication protocols and may be configured to work with devices from the same manufacturer. Each ecosystem may also be controlled by a smart home hub, such as the Nest Hub® and/or by a server. Each ecosystem may also be controlled by an application, such as the Google Home® app operating on a smart phone or other electronic device. As described below, each ecosystem may be primarily configured to use devices from the same manufacturer, however ecosystems may also be configured to accept registration and use of devices from other ecosystems. For example, the Google Home® app may be used to monitor, control, and interact with devices from Google® and from other manufacturers together as part of the same smart home environment.

Figure 3:
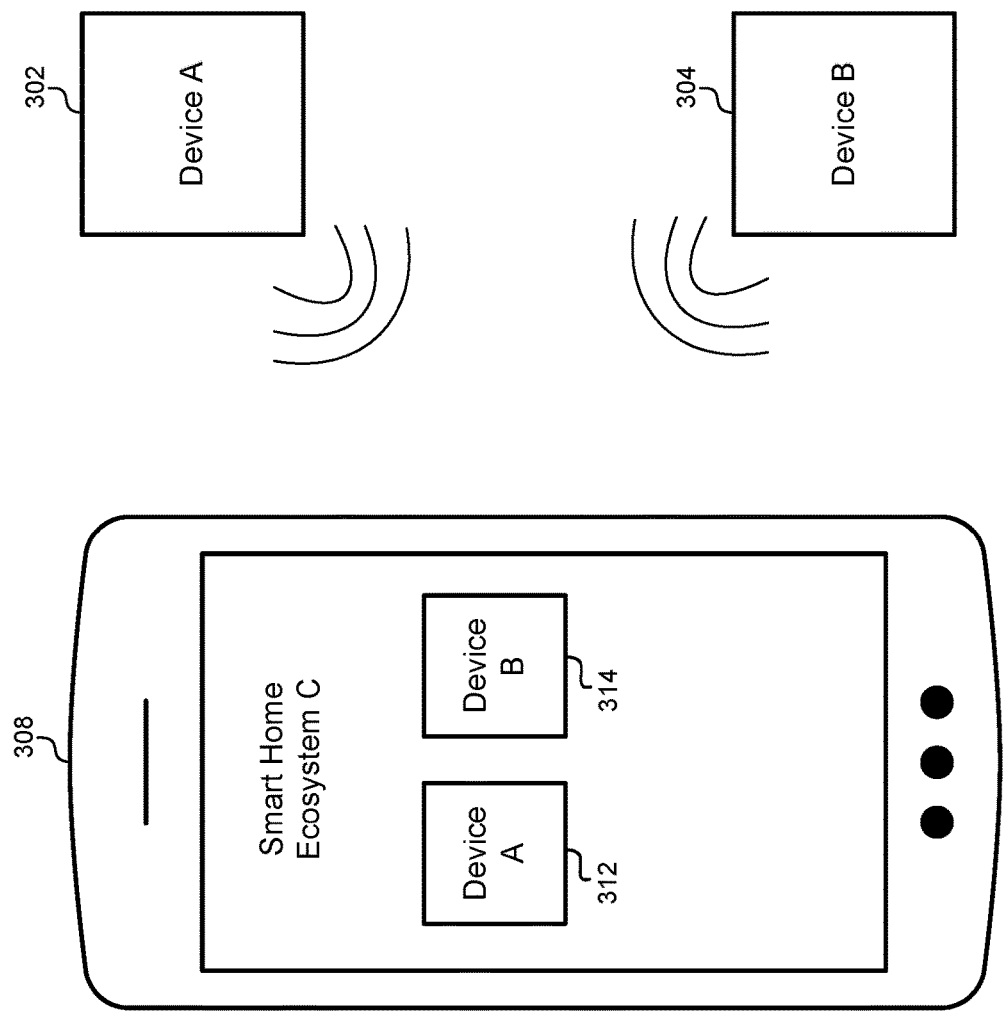
FIG. 3 illustrates an example of smart home devices operating within a structure, according to some embodiments.

FIG. 3 illustrates an example of smart home devices operating within a structure, according to some embodiments. In this example, it may be assumed that a first device 302 (e.g., a thermostat) may be provided from a first manufacturer, and may thus be compatible with a first ecosystem provided by the first manufacturer. Within the same enclosure, a second device 304 (e.g., a security system) may also be installed that is provided by a second manufacturer. The second device 304 may be compatible with a second ecosystem and provided by the second manufacturer. Each ecosystem may be controlled and monitored by a control device 308, such as a smart phone or digital home assistant.

In some cases, each ecosystem would be represented by a different application ("app") on a smart phone or a different control device. For example, a different home assistant device (e.g., a display assistant device and/or a voice assistant device) may be used to control its own corresponding ecosystem. Thus, the first device 302 would be controlled by a first home assistant associated with the first ecosystem, while the second device 304 would be controlled by a second home assistant associated with the second ecosystem. Alternatively, a user's smart phone could include "home" applications for each ecosystem. In order to control all the devices in a multi-ecosystem home, a user would need to toggle back and forth between multiple apps and/or multiple control devices. For example, two ecosystems may operate independently in parallel with each other to accommodate the first device 302 and the second device 304 from different manufacturers.

Recently, efforts have been made to generate an industry-unifying standard that allows devices from separate ecosystems to work together seamlessly in a single environment. This allows smart home devices to work together reliably when purchased from different manufacturers. For example, the MATTER® connectivity standard is built upon the Internet Protocol (IP) and runs on, for example, Wi-Fi and Thread network layers through Bluetooth Low Energy (BLE) for commissioning devices. This unifying protocol enables communication across smart home devices, mobile apps, cloud services, and other devices. The MATTER® standard is an open source, unified connectivity protocol that allows communications between devices from multiple manufacturers (e.g., Google®, Amazon®, Apple®, and so forth). For example, a Google Home® or a Google Hub® may be used to control a Google Nest Thermostat® alongside speakers from another manufacturer, a security system from another manufacturer, etc., in a unified interface. Alternatively, the Google Home® smart phone app may be used to control a Google Nest® doorbell, along with a smart appliance from another manufacturer within the same app. Although the MATTER® standard is used here is an example, this disclosure uses the term "multi-ecosystem protocol" to generically refer to any application layer protocol that allows different smart home ecosystems and devices to interoperate, for which the MATTER® standard represents one example.

For example, FIG. 3 illustrates how the first device 302 and the second device 304 can be controlled on the same control device 308 operating a single control application. The application may include a unified interface that is provided from a manufacturer that is different from the manufacturers providing the first device 302 and the second device 304. For example, the ecosystem for the application on the control device 308 may display icons 312, 314 for the first device 302 and the second device 304 together such that the first device 302 and the second device 304 can be controlled together in the same smart home control app. The application may allow the user to control, monitor, install, and provision smart home devices 302, 304 and any devices from any ecosystem and/or manufacturer in a single application. Although not shown explicitly in FIG. 3, the same interface may be provided on a digital home assistant (e.g., display assistant or voice assistant) as described above.

Using a multi-ecosystem protocol enables the interoperability between devices in different ecosystems illustrated in FIG. 3. For example, the first device 302 and/or the second device 304 may both operate according to the standards defined by the multi-ecosystem protocol. Specifically, the multi-ecosystem protocol operating, for example, on Wi-Fi and Thread network layers using BLE for device setup may allow the first device 302 and/for the second device 304 to be commissioned individually and controlled within the separate ecosystem of the application operating on the control device 308. For some devices, compatibility with the multi-ecosystem protocol be implemented using a firmware update. Alternatively, some newer devices may come with compatibility already built-in with the multi-ecosystem protocol.

Figure 4:
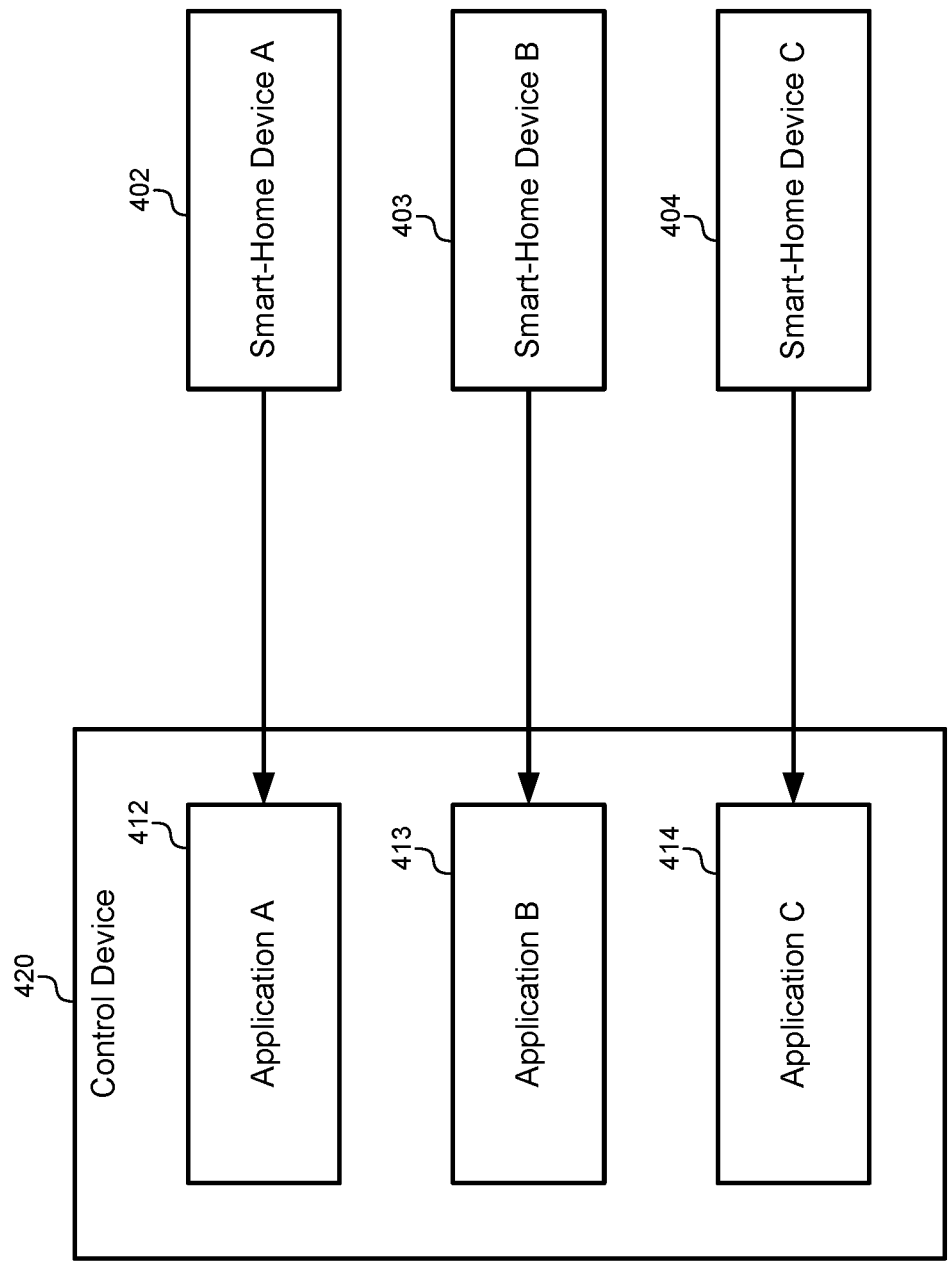
FIG. 4 illustrates an example of multiple applications used in the setup and control of multiple smart home devices, according to some embodiments.

FIG. 4 illustrates an example of multiple applications used in the setup and control of multiple smart home devices, according to some embodiments. For example, when previously adding a new router to a home network, the router may have been provided by manufacturer that is different from the ecosystem of other smart home devices in the home. In order to get the existing ecosystem to recognize the router, the user may first need to install an app specifically dedicated to controlling the router (e.g., a "TP-Link®" app). Using the router app, the user is able to setup the router and connect the controlling smartphone device (e.g., the smart phone or digital home/voice assistant) to the router. Next, to be incorporated into the existing ecosystem, the user can open the ecosystem app and add the router to the ecosystem using the multi-ecosystem protocol. This process is simplified using the multi-ecosystem protocol, which allows the router to communicate using the standard protocol directly with the controlling app of the other ecosystem. Thus, the previous proprietary connection between the router app and the router is replaced by the standard protocol between the router and the app of the separate ecosystem using the multi-ecosystem protocol.

For example, as illustrated in FIG. 4, a control device 420, such as a smart phone, may include applications 412, 413, 414 that are each configured to setup and control a specific and corresponding smart home device 402, 403, 404. For example, a first application 412 may be required to setup and configure a first smart home device 402 from a first manufacturer or ecosystem. The first application 412 may discover the first smart home device 402, and perform all of the required commissioning and connection tasks, such as connecting the first smart home device 402 to the control device 420, connecting to a local Wi-Fi network, configuring the parameters of the first smart home device 402, registering the first smart home device 402 with existing local and/or online user accounts, adding the first smart home device 402 to an existing ecosystem and control application, and so forth.

The embodiments described herein operate in conjunction with a multi-ecosystem protocol to simplify the user experience adding devices from one ecosystem to another ecosystem. For example, instead of requiring a specific setup to take place through the application specific to the device, the operating system of the smart phone itself may automatically detect, acquire, setup, and commission the new smartphone device, regardless of any particular ecosystem. For example, the Android® operating system may be modified to include smart home controls as part of the operating system. The embodiments described herein enable the operating system itself to acquire and control a new smart home device using the multi-ecosystem protocol. This allows the operating system itself to directly control the new smart home device. This solves the technical problem of requiring different proprietary applications to commission, discover, and/or add new smart home devices to an existing ecosystem. While the multi-ecosystem protocol may handle the communication link between the ecosystem control application and the device during operation, these embodiments also employ the operating system of the control device to seamlessly commission and add new devices to the ecosystem.

These embodiments also allow any application running on the smart phone to interact with the device through the operating system, even if the application itself was not specifically designed to handle this particular type of device. For example, an application may be designed on a smart phone to control the lights in a user's home. This application may be designed to control these lights without requiring specific information about the type of hardware and software used by the lights themselves. Instead, the lights can be detected and provisioned by the operating system of the smart home device using the multi-ecosystem protocol, and the application can then interface with the device through the operating system using a standard set of controls that are based on the device type (e.g., standard light controls). These embodiments instead allow the operating system of the device to handle the setup and communication with the devices and provide an interface to the applications that allows the application to be agnostic to the particular type of device it controls.

In some embodiments, a standardized set of software components may be provided by the operating system of the control device. Application developers for different ecosystems can build upon these software components. This standardizes the smart home device setup procedure at the mobile device platform level. This allows any app to use the standardized procedure instead of requiring the application developers to design their own custom setup implementation.

Figure 5:
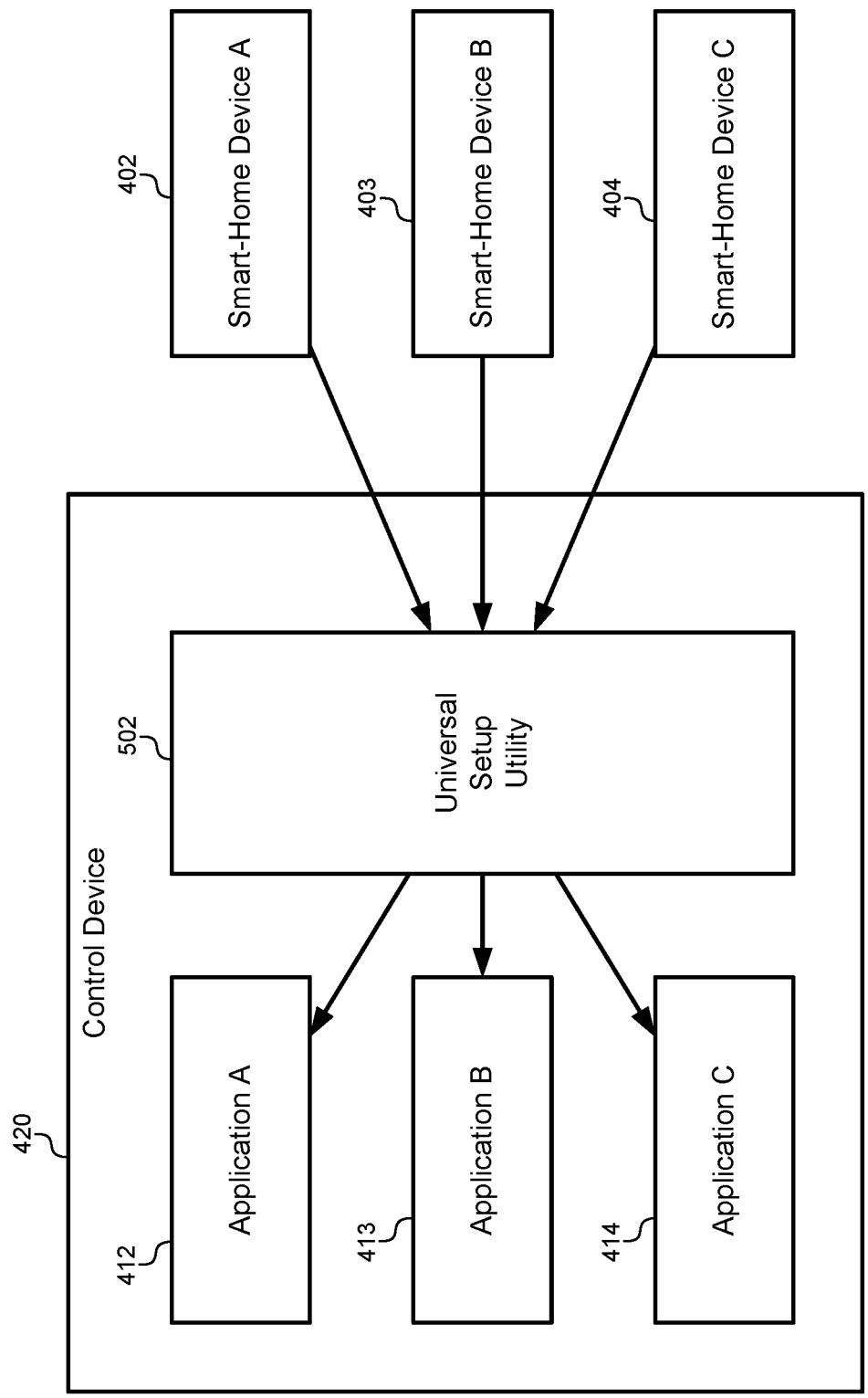
FIG. 5 illustrates how a universal setup utility in the operating system of the control device can facilitate the setup and provisioning of multiple smart home devices, according to some embodiments.

FIG. 5 illustrates how a universal setup utility 502 in the operating system of the control device 420 can facilitate the setup and provisioning of multiple smart home devices, according to some embodiments. In contrast to the configuration in FIG. 4 described above, the configuration in FIG. 5 uses a universal setup utility 502 to initially perform the setup for each of the smart home devices 402, 403, 404, including commissioning of the devices. Thus, setup and commissioning of the smart home devices 402, 403, 404 may be performed by the operating system rather than requiring a specific application that has specific design knowledge of the smart home devices 402, 403, 404.

In some embodiments, the universal setup utility 502 may first be used by the operating system to identify a new smart home device to be added to the smart home environment. For example, to setup, configure, and/or commission the first smart home device 402, the user may scan a code (e.g., QR code) on the first smart home device using the universal setup utility 502. In other embodiments, the universal setup utility 502 may identify the first smart home device 402 by bringing the first smart home device 402 within a threshold proximity of the of the control device 420 (e.g., bringing the first smart home device 402 within a few feet of the control device 420 and tapping a button on the first smart home device 402). This may initiate the setup routine of universal setup utility 502. Instead of a proprietary application be used to detect the new smart home device, the universal setup utility 502 may perform a similar function as part of the operating system of the control devised 420.

In some scenarios, the operating system and the universal setup utility 502 may identify a new smart home device after the new device has entered the enclosure. Alternatively, some embodiments may receive a request from an application on the control device 420 to determine whether any new devices are available in the area. For example, the first application 412 may send a request to the universal setup utility 502 in the operating system to look for any new devices that are available. If the first smart home device 402 is identified, the universal setup utility 502 may setup the first smart home device 402 on behalf of the first application 412.

Using the multi-ecosystem protocol, the universal setup utility 502 may receive a standard set of information from the first smart home device 402. This standard set of information may be defined by the multi-ecosystem protocol and may include the name of the first smart home device 402, a type of device, actions that can be performed by the device, controls the may be used by the device, and/or other operating information. For example, when connecting to a smart plug, outlet, or switch, the device may communicate a unique name of the device; a serial number, manufacturer, or other identifying information for the device; standard control such as an indication that the device may be turned on or turned off; and/or any other operations that may be performed by the device. This information may be queried explicitly or returned as an initial communication from the first smart home device 402 when connecting to the universal setup utility 502.

The universal setup utility 502 may also be equipped with a standard set of controls. This standard set of controls may include controls that perform functions such as turning the device on, turning the device off, and other controls that may apply universally to smart home devices of specific types. Other sets of controls may be selected based upon the type of the smart home device. For example, regardless of the manufacturer of a thermostat, a set of thermostat controls may include functions such as raising a setpoint temperature, lowering a setpoint temperature, adding a scheduled setpoint, entering an away mode, and/or other thermostat controls. A set of controls for a hazard detector may include controls that activate an alarm, pause an alarm, silence an alarm, activate/deactivate sensors, and/or other hazard detector controls. Upon receiving the type of the smart home device, the set of controls may be assigned based on that type. For example, after identifying the device as a "thermostat" type, the universal setup utility 502 may assign a standard set of thermostat controls to the device. These assign controls may be used with any specific controls received from the smart home device. For example, the standard set of thermostat controls may be augmented by additional control indications from the smart home device that also allow the user to update a specialized control schedule for that specific thermostat. In some embodiments, a serial number or other identifier for the smart home device may be used to identify a standard set of controls. For example, the universal setup utility 502 may perform a look up of the serial number of the device to identify a device type and set of controls that should be assigned to that device. This allows controls to be dynamically maintained and updated outside of the device itself.

Note that the first application 412 may be any application operating on a control device 420. One of the advantages provided by these embodiments described herein is the ability for any application to interact with smart home devices through the operating system of the control device 420. Since the connection, setup, and commissioning of the smart-home devices is handled by the universal setup utility 502 of the operating system, the applications need not include any special code for interacting with these smart home devices from different ecosystems. This effectively decouples the control applications from the smart home devices. Note that, some applications may also communicate with the devices using their own credentials and code through the universal setup utility. For example, the universal setup utility 502 may receive credentials from the first application 412 and securely provide those credentials to the first smart home device 402.

After the initial setup, some embodiments may allow the applications 412, 413, 414 to interact with the smart home devices 402, 403, 404 through the universal setup utility 502 as described above. For example, at runtime, the first application 412 may send a request to the universal setup utility 502 to turn on the first smart home device 402. The universal smart home utility 502 can then communicate with the first smart home device 402 through the multi-ecosystem protocol. Thus, the first application 412 need not be aware of the type of hardware or software being run by the first smart home device 402, and need not be aware that the communication takes place using the multi-ecosystem protocol. In other embodiments the communication between applications and the smart home devices may run through the operating system without requiring continued use of the universal setup utility 502. In some embodiments, the universal setup utility 502 may map commands from the first application 412 to the standard set of commands for the device type of the first smart home device 402. For example, commands to adjust a setpoint temperature in the first application 412 may be translated by the universal setup utility 502 into a standard command to increase the temperature for a thermostat as the first smart home device 402.

The operations performed by the universal setup utility 502 may include any commissioning or other functions required in order for a new smart home device to be connected to the smart home environment and the ecosystem in use in the enclosure. For example, to setup the first smart-one device 402, the universal setup utility 502 may establish a local connection with the first smart home device 402, then provide network information and credentials such that the first smart home device 402 can connect to a local Wi-Fi or Thread network in the enclosure. The universal setup utility 502 may also generate and distribute credentials to the first smart home device 402 such that the first smart home device 402 can be authenticated with a user, a local network, the smart home ecosystem, and/or a specific application. In some configurations, the universal setup utility 502 may also register the first smart home device 402 in a database of devices that are part of the ecosystem for the enclosure. Registration may include pairing the device with the user account, synchronizing data between the first smart home device 402 and a server-based storage system, and so forth.

The first application 412 may represent a control application for a smart home environment or ecosystem as described above. For example, the first application may include the Google Home® application that controls a plurality of smart home devices in the smart home environment. The universal setup utility 502 may commission new devices as they are added to the ecosystem controlled by the first application 412. For devices that are not part of the ecosystem of the first application, the universal setup utility 502 may also provide standard commands that allow the first application 412 to send commands to the smart devices for manufacturers that would otherwise be outside of the ecosystem of first application 412.

Figure 6:
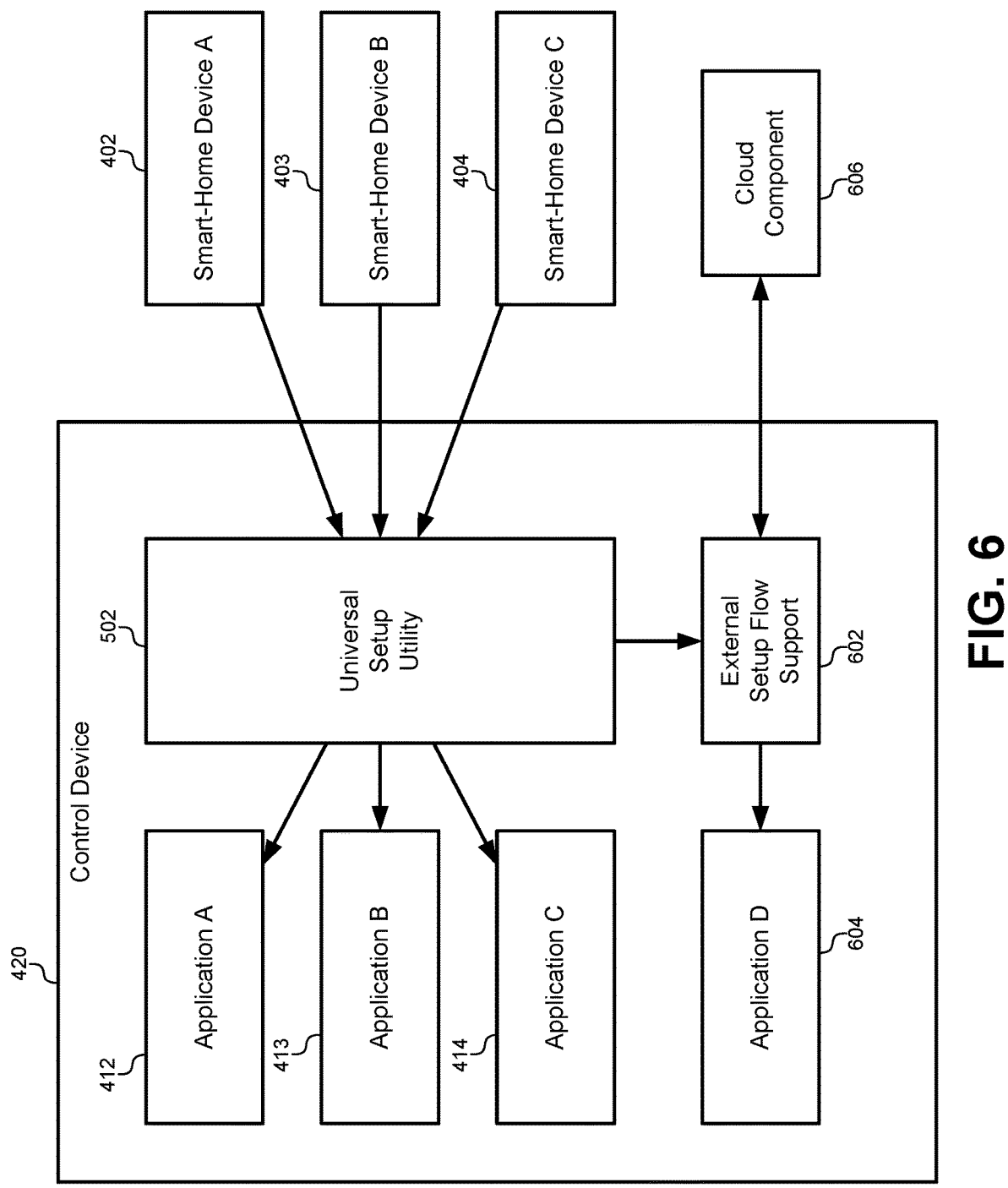
FIG. 6 illustrates a setup procedure for smart home devices that use external setup support, according to some embodiments.

FIG. 6 illustrates a setup procedure for smart home devices that use external setup support, according to some embodiments. Some smart home devices may include a more complex setup routine than other smart home devices. Although simple smart home devices may be setup entirely by the routine executed by the universal setup utility 502 using the multi-ecosystem protocol, other smart home devices may include more complex setup procedures that require additional user interactions or downloaded utilities. This capability allows the universal setup utility 502 to handle new smart home devices without requiring upgrades to the software of the universal setup utility 502.

For example, the second smart home device 403 may provide an indication to the universal setup utility 502 that additional information from an external source may be used for setup. This indication may include a URL or other resource locator that identifies where the external information should be requested by the universal setup utility 502. For example, the second smart home device 403 may provide a URL to a video or PDF document that explains additional setup routines for the user. This video or document may be displayed interactively such that the user can complete the setup instructions for the second smart home device 403. Alternatively, the second smart home device 403 may provide a URL to setup utilities or other executable code that may downloaded and/or executed by the operating system using the universal setup utility 502 to perform any specialized sets of routines for commissioning, registering, or otherwise initializing the use of the second smart home device 403.

Some embodiments may include a process 602 that supports the use of an external setup flow for connecting a smart home device to an application 604. This process 602 may contact an external cloud component 606 or other external data source to retrieve information for the setup flow. This information may include the videos, documents, etc., described above to provide an additional set of instructions. This information may also include additional utilities, drivers, or other executables that may be used by the universal setup utility 502 to set up and communicate with the smart home device. In some embodiments, the process 602 may be downloaded and executed on the control device 422 complete the setup of the second smart home device 403. For example, a driver or setup utility may be downloaded and executed on the control device 420. The process 602 may download additional information, parameters, setup information, executables, and/or the like from an associated cloud component 606. The cloud component 606 may be operated by a manufacturer of the second smart home device 403. The process 602 may return control back to the universal setup utility 502 in the operating system upon completion of any commissioning tasks that are executed by the process 602.

Figure 7:
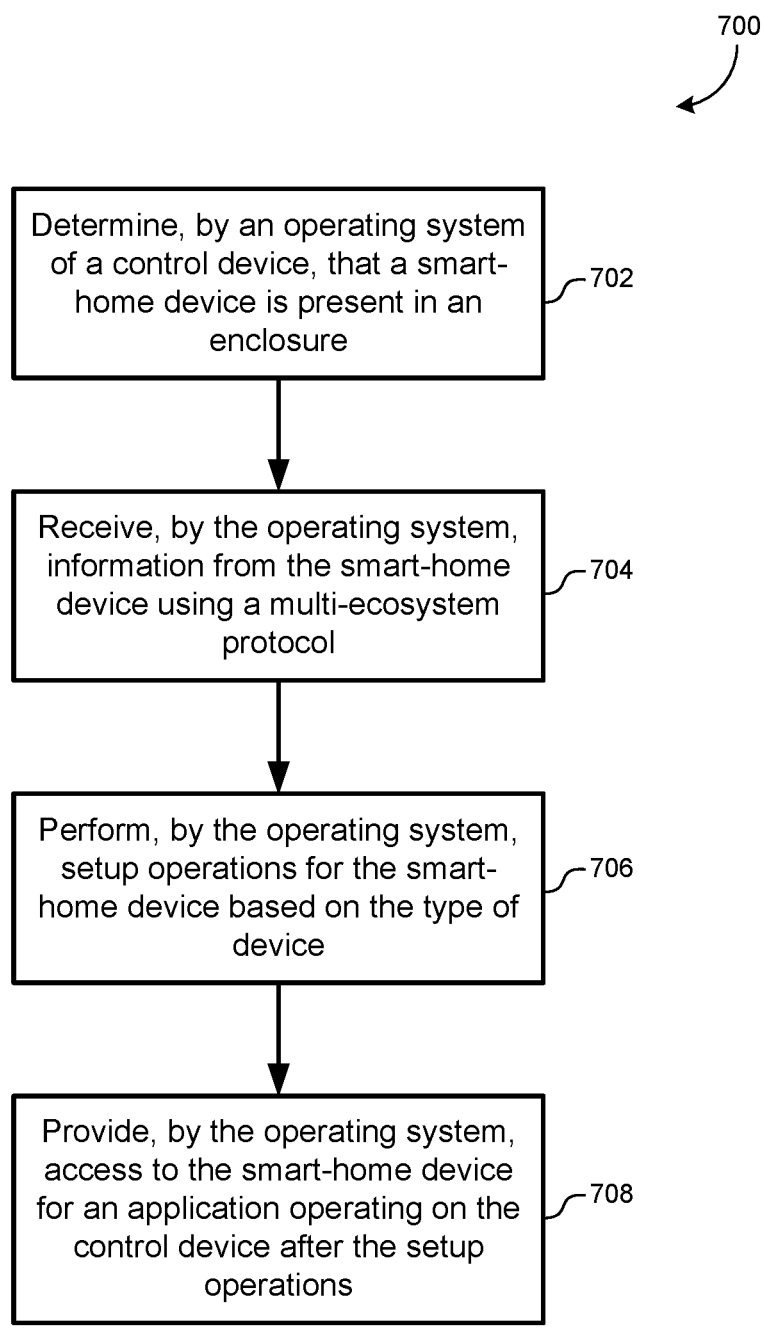
FIG. 7 illustrates a flowchart of a method of performing a setup of the smart home device, according to some embodiments.

FIG. 7 illustrates a flowchart 700 of a method of performing a setup of the smart home device, according to some embodiments. The universal setup utility 502 may execute a method to set up a new smart home device in a structure with an existing smart home ecosystem. As described above, the ecosystem providing smart home device may be different from the ecosystem being run by the control device 420 in the enclosure. For example, the method may be executed by one or more processors on a control device, such as a smart phone. One or more memory devices (such as a non-transitory computer-readable medium) may store instructions that cause the one or more processors to perform these operations. These instructions may be part of a control application for an ecosystem of the smart home environment. Alternatively, these instructions may represent any other application that may access or control the smart home device. The application may be from a different ecosystem from the smart home device.

The method may include determining that a new smart home device is present in the enclosure (702). This determination may be made by automatically detecting the presence of a new smart home device within the vicinity of the control device. Alternatively, this determination may be made by receiving an input from a user indicating that a new device is available to be commissioned. For example, a user may bring the smart home device into a proximity of the control device and tap a button on the smart home device to send the communication or initiate a wireless transmission to the control device. Some smart home devices may send the communication directly to the application through a wireless protocol indicating that the new device is available and ready to be commissioned. This transmission may be part of the multi-ecosystem protocol.

The method may also include retrieving information from the smart home device using the multi-ecosystem protocol (704). The information may be received directly through a wireless communication from the smart home device using the multi-ecosystem protocol. In some embodiments, the information may also be received by scanning a QR code or receiving another input of a code associated with the smart home device. The information may include a type of the device (e.g., a thermostat, a light switch, a hazard detector, an audio speaker, a security system sensor, and so forth). The information may additionally include a serial number, a device name, a device manufacturer or ecosystem, and/or any other descriptive information related to the smart home device.

In some embodiments, the information may include basic controls or control types associated with the device. For example, a light switch may provide an indication that the device may be turned on/off. This basic set of controls may be mapped or correspond to a set of controls provided by the universal setup utility of the operating system of the control device. The controls may also be determined by the universal setup utility by virtue of the device type or other identifier of the smart home device. For example, a serial number or part number for the smart home device may be used to perform a lookup operation and retrieve the set of controls associated with that device from an online database.

The method may also include performing setup operations for the smart home device based on the type of the device (706). For example, the universal setup utility may perform setup operations that include commissioning activities, such as connecting the smart home device to a local network, registering the device with a user account, pairing the new smart home device with a control device 420, adding the smart home device to the smart home ecosystem, and/or any other commissioning actions. In some embodiments, the set of operations may include accessing an external process, such as a URL, website, video, PDF, or executable process that complements the set of operations performed by the universal setup utility 502 of the operating system. For example, a URL or other link may be provided to the operating system to download or access an external setup flow or process that performs at least a part of the commissioning and setup process. This external setup flow or process may access a cloud component or other online utility associated with the manufacturer of the smart home device. This process may also access other applications on the control device, such as an application for specifically controlling devices from this manufacturer.

The method may additionally include providing access to the smart home device for an application operating on the control device after the setup operations (708). In some implementations, the application may now communicate directly with the smart home device using the multi-ecosystem protocol. This communication need not involve the operating system or the universal setup utility directly. In other implementations, the application may communicate with the smart home device through the operating system of the control device. For example, in order to issue a command to the smart home device, the application may issue a command corresponding to a control in the standard set of controls for this device type that were previously mapped and provided by the operating system, such as turning the smart home device on/off. The operating system may then issue that command to the smart home device using the multi-ecosystem protocol or a proprietary protocol of the smart home device. The application may include a control application for the ecosystem, which may be different from the ecosystem of the manufacturer of the smart home device. The operating system may include an operating system for the control device 420, such as the Android® operating system.

It should be appreciated that the specific steps illustrated in FIG. 7 provide particular methods of performing a setup of a smart home device according to various embodiments. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of performing a setup of a smart home device, the method comprising:
   determining, by an operating system of a control device, that a first smart home device and a second smart home device are present in a structure, wherein the first smart home device is associated with a first smart home ecosystem, and the second smart home device is associated with a second smart home ecosystem;
   receiving, by the operating system, information from the first smart home device and the second smart home device via wireless transmissions received through a multi-ecosystem protocol, wherein the information identifies a type of device for the first smart home device and the second smart home device, and the multi-ecosystem protocol comprises an application-layer protocol configured to communicate with smart home devices from a plurality of different smart home ecosystems;
   performing, by the operating system, initial setup operations for the first smart home device and the second smart home device to operate on a local network based on the type of device; and
   providing, by the operating system, access to the first smart home device and the second smart home device for an application operating on the control device after the initial setup operations.

2. The method of claim 1, further comprising automatically detecting a presence of the first smart home device in the structure.

3. The method of claim 2, wherein automatically detecting the presence of the first smart home device comprises receiving a wireless transmission from the first smart home device, wherein the wireless transmission is initiated by bringing the first smart home device within a proximity of a control device and pressing a button on the first smart home device.

4. The method of claim 1, wherein the information from the first smart home device comprises a first device type.

5. The method of claim 4, wherein the first device type comprises a thermostat, a hazard detector, a component of a security system, a smart appliance, or a smart doorbell.

6. The method of claim 1, wherein the information comprises one or more controls for providing commands to the first smart home device.

7. A non-transitory computer-readable medium comprising instructions that, when executed by one or more processors, cause the one or more processors to perform operations comprising:
   determining, by an operating system of a control device, that a first smart home device is and a second smart home device are present in a structure, wherein the first smart home device is associated with a first smart home ecosystem, and the second smart home device is associated with a second smart home ecosystem;
   receiving, by the operating system, information from the first smart home device and the second smart home device via wireless transmissions received through a multi-ecosystem protocol, wherein the information identifies a type of device for the first smart home device and the second smart home device, and the multi-ecosystem protocol comprises an application-layer protocol configured to communicate with smart home devices from a plurality of different smart home ecosystems;
   performing, by the operating system, initial setup operations for the first smart home device and the second smart home device to operate on a local network based on the type of device; and
   providing, by the operating system, access to the first smart home device and the second smart home device for an application operating on the control device after the initial setup operations.

8. The non-transitory computer-readable medium of claim 7, wherein the operations further comprise assigning, by the operating system, a standard set of controls to the first smart home device based on the type of the first smart home device.

9. The non-transitory computer-readable medium of claim 8, wherein the standard set of controls comprises controls for turning the first smart home device on or off.

10. The non-transitory computer-readable medium of claim 8, wherein the standard set of controls are retrieved from an online database based on the type of the first smart home device.

11. The non-transitory computer-readable medium of claim 7, wherein the setup operations comprise connecting the first smart home device to a local Wi-Fi network using the multi-ecosystem protocol.

12. The non-transitory computer-readable medium of claim 11, wherein the setup operations comprise providing credentials for the local Wi-Fi network to the first smart home device using the multi-ecosystem protocol.

13. The non-transitory computer-readable medium of claim 7, wherein the setup operations comprise registering the first smart home device with a smart home ecosystem of the structure, wherein the smart home ecosystem of the structure is provided from a first manufacturer that is different from a second manufacturer of the first smart home device.

14. A control device comprising:
one or more processors; and
one or more memory devices comprising instructions that, when executed by the one or more processors, cause the one or more processors to perform operations comprising:
determining, by an operating system of a control device, that a first smart home device and a second smart home device are present in a structure, wherein the first smart home device is associated with a first smart home ecosystem, and the second smart home device is associated with a second smart home ecosystem;
receiving, by the operating system, information from the first smart home device and the second smart home device via wireless transmissions received through a multi-ecosystem protocol, wherein the information identifies a type of device for the first smart home device and the second smart home device, and the multi-ecosystem protocol comprises an application-layer protocol configured to communicate with smart home devices from a plurality of different smart home ecosystems;
performing, by the operating system, initial setup operations for the first smart home device and the second smart home device to operate on a local network based on the type of device; and
providing, by the operating system, access to the first smart home device and the second smart home device for an application operating on the control device after the initial setup operations.

15. The control device of claim 14, wherein the control device comprises a smart phone or an electronic home assistant, and the instructions are part of a universal setup utility for commissioning a plurality of smart home devices that are part of a smart home environment, wherein the smart home environment comprises an ecosystem that is different from an ecosystem of a manufacturer of the first smart home device.

16. The control device of claim 14, wherein providing access to the first smart home device for the application comprises the application communicating directly with the first smart home device using the multi-ecosystem protocol.

17. The control device of claim 14, wherein providing access to the first smart home device for the application comprises the application communicating with the operating system, and the operating system communicating with the first smart home device using the multi-ecosystem protocol.

18. The control device of claim 14, wherein the operations further comprise, as part of the setup operations, receiving a universal resource locator (URL) from the first smart home device, and using the URL to retrieve a process that executes at least a portion of the setup operations for the first smart home device.

19. The control device of claim 18, wherein the operations further comprise accessing a cloud component of a manufacturer of the first smart home device by the process as part of the setup operations.

* * * * *